(12) United States Patent
Florczak

(10) Patent No.: US 11,559,037 B2
(45) Date of Patent: Jan. 24, 2023

(54) ANIMAL TAG, METHOD AND COMPUTER PROGRAM FOR DETERMINING BEHAVIOR-RELATED DATA

(71) Applicant: DELAVAL HOLDING AB, Tumba (SE)

(72) Inventor: Keld Florczak, Tumba (SE)

(73) Assignee: DeLaval Holding AB, Tumba (SE)

( * ) Notice: Subject to any disclaimer, the term of this patent is extended or adjusted under 35 U.S.C. 154(b) by 51 days.

(21) Appl. No.: 17/057,521

(22) PCT Filed: May 20, 2019

(86) PCT No.: PCT/SE2019/050456
§ 371 (c)(1),
(2) Date: Nov. 20, 2020

(87) PCT Pub. No.: WO2019/226100
PCT Pub. Date: Nov. 28, 2019

(65) Prior Publication Data
US 2021/0195869 A1 Jul. 1, 2021

(30) Foreign Application Priority Data
May 23, 2018 (SE) .................................... 1850605-5

(51) Int. Cl.
*A01K 11/00* (2006.01)
*H04W 4/029* (2018.01)
(Continued)

(52) U.S. Cl.
CPC .......... *A01K 11/004* (2013.01); *A01K 29/005* (2013.01); *G08C 17/02* (2013.01); *H04W 4/029* (2018.02)

(58) Field of Classification Search
CPC .. A01K 11/006; A01K 11/004; A01K 27/006; A01K 29/005; H04Q 9/02; H04Q 2209/40
(Continued)

(56) References Cited

U.S. PATENT DOCUMENTS 8,979,757 B2 3/2015 Mottram et al.
9,220,242 B2 12/2015 Roosenboom et al.
(Continued)

FOREIGN PATENT DOCUMENTS

EP 2 510 783 A1 10/2012
WO 97/00451 1/1997
(Continued)

OTHER PUBLICATIONS

International Search Report for PCT/SE2019/050456 dated Jul. 22, 2019, 3 pages.
(Continued)

*Primary Examiner* — Omar Casillashernandez
(74) *Attorney, Agent, or Firm* — Nixon & Vanderhye

(57) ABSTRACT

A three-dimensional accelerometer in an animal tag registers a first set of acceleration parameters expressing a respective acceleration of the tag along each of three independent spatial axes. A processor in the tag derives a respective estimated gravity-related component in each parameter in the first set, and compensates for the respective estimated gravity-related components in the first set to obtain a second set of acceleration parameters representing respective accelerations of the animal tag along each of three independent spatial axes each in which the parameter is balanced around a base level with no influence of gravitation. The processor determines behavior-related data of rise-up and/or lie-down movements of an animal carrying the animal tag based on
(Continued)

deviations in a single parameter in the second set of acceleration parameters relative to the base level.

19 Claims, 3 Drawing Sheets

(51) Int. Cl.
*A01K 29/00* (2006.01)
*G08C 17/02* (2006.01)

(58) Field of Classification Search
USPC .................................................. 340/870.07
See application file for complete search history.

(56) References Cited

U.S. PATENT DOCUMENTS

| | | |
|---|---|---|
| 9,766,263 B2 | 9/2017 | Gyoengy et al. |
| 2008/0288200 A1 | 11/2008 | Noble |
| 2009/0161915 A1* | 6/2009 | Chen .................... A61B 5/1117 |
| | | 382/107 |
| 2011/0102154 A1* | 5/2011 | Hindhede ............. G01S 13/878 |
| | | 340/10.1 |
| 2017/0372580 A1* | 12/2017 | Vivathana ............... G01S 19/42 |

FOREIGN PATENT DOCUMENTS

| | | |
|---|---|---|
| WO | 2010/066429 | 6/2010 |
| WO | 2011/120529 | 10/2011 |
| WO | 2013/005038 | 1/2013 |

OTHER PUBLICATIONS

Written Opinion of the ISA for PCT/SE2019/050456 dated Jul. 22, 2019, 6 pages.
Swedish Search Report for SE-1850605-5 dated May 23, 2018, 2 pages.
[ONLINE], "Anonymous", "Accelerometer—Wikipedia", URL:https://en.wikipedia.ore/wiki/Accelerometer, Jul. 10, 2019, 12 pages.
[ONLINE], "Anonymous", "Accelerometer—Wikipedia", URL:https://en.wikipedia.org/w/index.php?Accelerometer&oldid=488513625#Consumer_electronics, Apr. 21, 2012, 16 pages.

\* cited by examiner

ANIMAL TAG, METHOD AND COMPUTER PROGRAM FOR DETERMINING BEHAVIOR-RELATED DATA

This application is the U.S. national phase of International Application No. PCT/SE2019/050456 filed May 20, 2019 which designated the U.S. and claims priority to SE Patent Application No. 1850605-5 filed May 23, 2018, the entire contents of each of which are hereby incorporated by reference.

TECHNICAL FIELD

The present invention relates generally to registering of animal behavior data. More particularly the invention relates to an animal tag and method of determining behavior-related data. The invention also relates to a computer program and a non-volatile data carrier.

BACKGROUND

For animal-health reasons and to maintain high quality and efficiency in animal-based food production it is important that the physical status of livestock animals can be monitored in a convenient and reliable manner. To this aim, the identification tags are now being equipped with sensors that are becoming more resourceful for each new generation.

EP 2 510 783 describes one example of a method for monitoring the movements of an animal. Here, the animal is provided with a device having sensor means for detecting movements, and generating at least a signal with information about detected movements of the animal. The device is further provided with a control unit for processing the information in the signal and for storing the processed information and transmitter means for transmitting information stored in the control unit. The method involves: storing in the control unit a number of predetermined-type movements counted during a predetermined set of periods which comprises a number of successive first periods, and transmitting a number of the stored numbers of counted movements at moments which depend on the number of detected predetermined-type movements in at least one of the past first periods and/or depend on at least one of the stored orientations of the sensor means. The sensor means are implemented as a G-sensor capable of measuring accelerations in three dimensions and measuring the orientation of the sensor with respect to the earth's surface.

Traditionally, measuring orientation parameters requires gyroscopic sensors, which are comparatively energy demanding. Considering the size and operation life-span requirements of animal tags, it is challenging to integrate orientation sensors in animal tags.

SUMMARY

The object of the present invention is to offer a solution for providing orientation based animal-behavior data without requiring gyroscopic sensors.

According to one aspect of the invention, the object is achieved by an animal tag containing a three-dimensional accelerometer and a processing unit. The three-dimensional accelerometer is configured to register a first set of acceleration parameters expressing a respective acceleration of the animal tag along each of three independent spatial axes. The processing unit is configured to receive the first set of acceleration parameters, and based thereon determine behavior-related data. More precisely, the processing unit is configured to derive a respective estimated gravity-related component in each parameter in the first set of acceleration parameters. The processing unit is further configured to compensate for the respective estimated gravity-related components in the first set of acceleration parameters to obtain a second set of acceleration parameters representing a respective acceleration of the animal tag along each of three independent spatial axes. In the second set, each acceleration parameter is balanced around a base level with no influence of gravitation. Then, based on deviations in a single parameter in the second set of acceleration parameters relative to the base level, the processing unit is configured to discriminate rise-up and/or lie-down movements of an animal carrying the animal tag.

This animal tag is advantageous because it provides reliable detection of altitude changes exclusively based on accelerometer data. Since accelerometers have relatively low power consumption, especially compared to gyroscopic sensors, the invention enables energy-efficient detection of complex motion patterns.

According to one embodiment of this aspect of the invention, the processing unit is specifically configured to discriminate a positive deviation from the base level in one parameter in the second set of acceleration parameters to represent a rise-up movement of the animal carrying the animal tag; and analogously, discriminate a negative deviation from the base level in one parameter in the second set of acceleration parameters to represent a lie-down movement. This means that individual lying times and standing times can be established very accurately.

According to a further embodiment of this aspect of the invention, the animal tag contains a signal transmitter configured to emit a wireless signal uniquely identifying the animal tag. The wireless signal is adapted to be received by a number of base stations of a positioning system so as to enable the positioning system to establish a two-dimensional location for the animal tag, for example based on triangulation measurements. As a result, the individual lying times and standing times can be correlated with position data, and the exact positions for the respective activities can be registered. Consequently, precise behavior-related information can be derived for each animal. Moreover, by integrating the rise-up and/or lie-down movements accurate elevation positions for the animal tag and its carrier can also be determined via the positioning system.

Preferably, the animal tag also contains a wireless interface configured to emit a wireless signal, e.g. via radio, containing the at least one piece of the behavior-related data. Hence, the behavior-related data is made available for external processing and analysis in a highly convenient manner.

According to another embodiment of this aspect of the invention, the animal tag contains a data storage unit and the processing unit is further configured to: assign a respective time stamp to pieces of the behavior-related data, and store a set of the pieces of the behavior-related data together with said respective time stamps assigned thereto in the data storage unit.

Preferably, the processing unit is also configured to: retrieve at least one piece of the behavior-related data and at least one respective time stamp assigned thereto from the data storage unit, and cause the wireless interface to emit the wireless signal containing the at least one piece of the behavior-related data and the at least one respective time stamp assigned thereto retrieved from the data storage unit. Thereby, the animal tag may record behavior-related data over a period of time and subsequently report this data to a wireless receiver. Naturally, this provides flexibility and enables further economizing of the energy resources.

According to yet another embodiment of this aspect of the invention, the processing unit is configured to cause identification data to be included in the wireless signal, which identification data is adapted to enable receivers of the wireless signal to determine an identity of the animal tag. In other words, a receiver of the wireless signal is informed about the relevant animal identity. Typically, this is a key factor for a meaningful analysis of the behavior-related data.

According to still another embodiment of this aspect of the invention, the animal tag is configured to be to be attached on a neckband and/or to ear of the animal. This attains a high degree of flexibility.

According to another aspect of the invention, the object is achieved by a method to be implemented in an animal tag to determine behavior-related data concerning an animal to which the animal tag is attached. The method involves registering, via a three-dimensional accelerometer, a first set of acceleration parameters expressing a respective acceleration of the animal tag along each of three independent spatial axes. The method further involves determining, in a processing unit, the behavior-related data based on the first set of acceleration parameters. This, in turn, involves: deriving a respective estimated gravity-related component in each parameter in the first set of acceleration parameters; compensating for the respective estimated gravity-related components in the first set of acceleration parameters to obtain a second set of acceleration parameters representing a respective acceleration of the animal tag along each of three independent spatial axes each in which said parameter is balanced around a base level with no influence of gravitation; and discriminating rise-up and/or lie-down movements of the animal based on deviations in a single parameter in the second set of acceleration parameters relative to the base level. The advantages of this method, as well as the preferred embodiments thereof, are apparent from the discussion above with reference to the control unit.

According to a further aspect of the invention, the object is achieved by a computer program loadable into a non-volatile data carrier communicatively connected to a processing unit. The computer program includes software for executing the above method when the program is run on the processing unit.

According to another aspect of the invention, the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
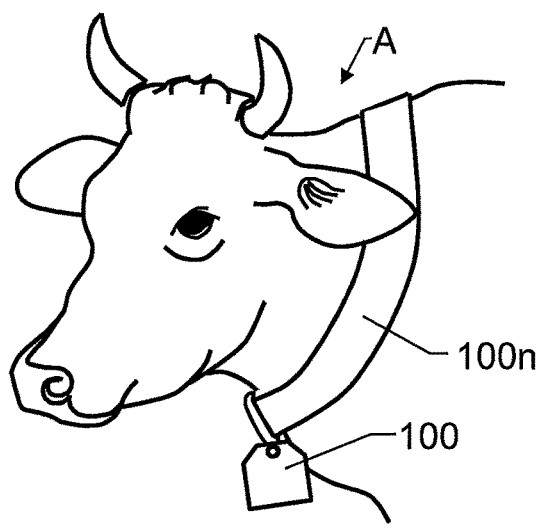
FIG. 1 shows a first example of how the tag according to the invention can be attached to a neckband on an animal.
Figure 2:
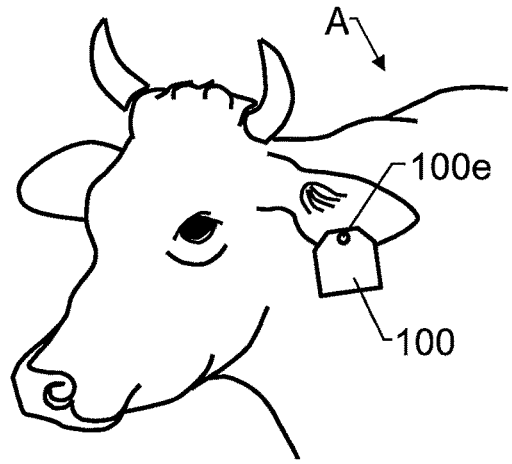
FIG. 2 shows a second example of how the tag according to the invention can be arranged in the ear of an animal.

FIGS. 1 and 2 illustrate two different examples of how the animal tag 100 according to the invention may be positioned on an animal A. In FIG. 1, the tag 100 is attached to a neckband 100n. In FIG. 2, the tag 100 is instead attached to an ear of the animal A, for example via a piercing shaft member 100e and a backing member on the opposite side of the ear (not shown).

Figure 3:
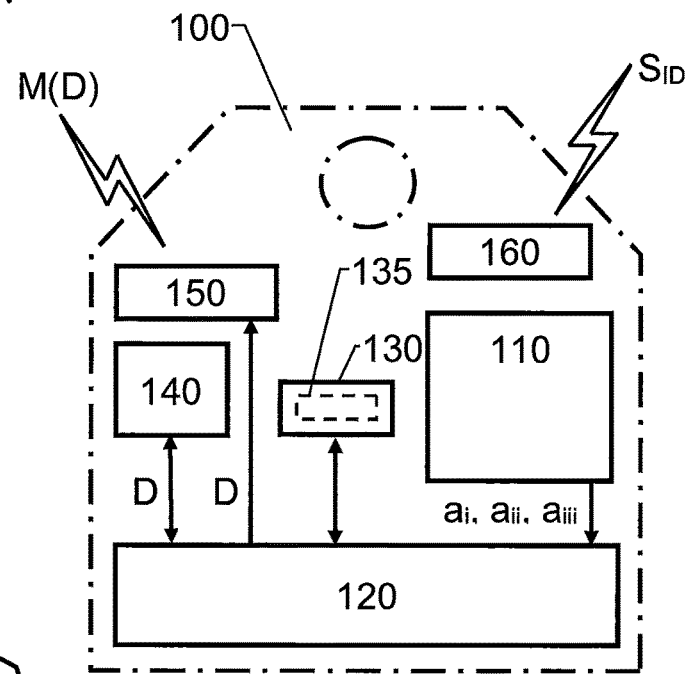
FIG. 3 shows a block diagram over an animal tag according to one embodiment of the invention.

Turning now to FIG. 3, we see a block diagram over the animal tag 100 according to one embodiment of the invention. The animal tag 100 contains a three-dimensional accelerometer 110 and a processing unit 120. According to embodiments of the invention, the animal tag 100 may also include one or more of a non-volatile data carrier 130, a data storage unit 140 and a wireless interface 150, e.g. of one of the following type: radio, optic or acoustic.

The three-dimensional accelerometer 110 is configured to register a first set of acceleration parameters $a_i$, $a_{ii}$ and $a_{iii}$ expressing a respective acceleration of the animal tag 100 along each of three mutually independent spatial axes.

Figure 4A:
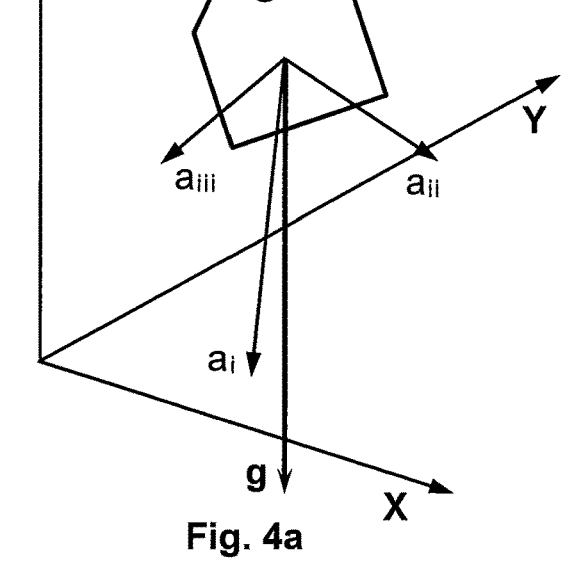
FIGS. 4a-b show vector diagram examples of how the acceleration of the animal tag may be expressed in three independent dimensions.

FIG. 4a shows an example of the acceleration parameters $a_i$, $a_{ii}$ and $a_{iii}$ in the form of a vector diagram. Here, first and second axes X and Y represent a plane parallel to the sea level, and a third axis Z represents a vertical dimension orthogonal to the XY plane. Depending on how the animal A moves and/or is positioned, the animal tag 100 and its three-dimensional accelerometer 110 may have an arbitrary orientation relative to the first, second and third axes X, Y and Z respectively. Nevertheless, gravity g, i.e. the constant downward acceleration of the animal tag 100 resulting from the earth's gravitational pull is always parallel to the third axis Z.

Figure 4B:
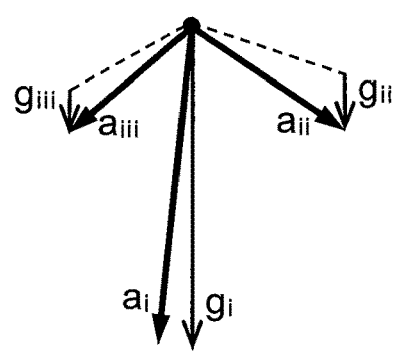

The acceleration parameters $a_i$, $a_{ii}$ and $a_{iii}$ may be separated into vector components that are parallel to each the first, second and third axes X, Y and Z respectively. In FIG. 4b, respective vector components $g_i$, $g_{ii}$ and $g_{iii}$ of the acceleration parameters $a_i$, $a_{ii}$ and $a_{iii}$ being parallel to the third axis Z are illustrated specifically. In most cases, such a separation of the acceleration parameters $a_i$, $a_{ii}$ and $a_{iii}$ leads to that one of the vector components $g_i$, $g_{ii}$ and $g_{iii}$ is substantially larger than the other two. In the example of FIG. 4b, $g_i$ represents such a dominant vector component.

Figure 5:
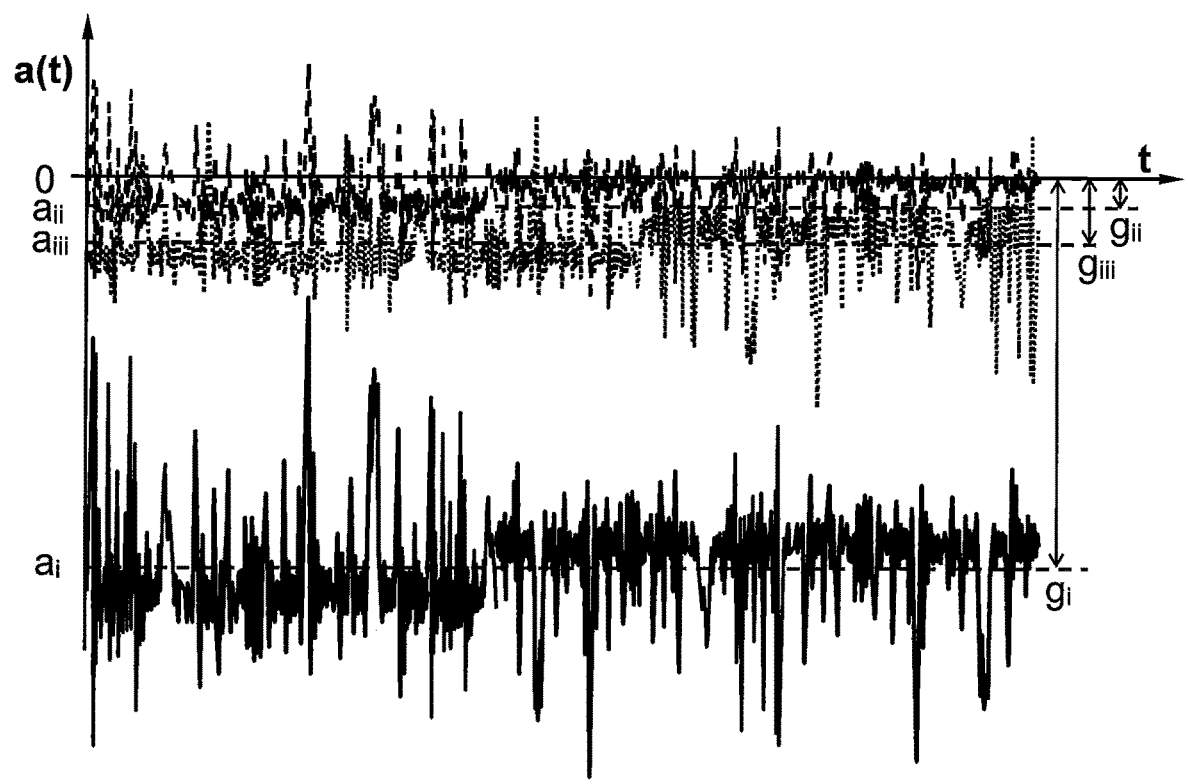
FIG. 5 illustrates an example of how a first set of acceleration parameters may vary over time.

FIG. 5, shows a diagram exemplifying how the individual acceleration parameters $a_i$, $a_{ii}$ and $a_{iii}$ in the first set of acceleration parameters a(t) may vary over time t. Here, $a_{ii}$ and $a_{iii}$ fluctuate around a respective bias component corresponding to the vector components $g_{ii}$ and $g_{iii}$ illustrated in FIG. 4b. As can be seen, the bias components in $a_{ii}$ and $a_{iii}$ are both relatively small. However, $a_i$ fluctuates around a comparatively large bias component, corresponding to the vector component $g_i$ in FIG. 4b. Due to the sign of the gravity g relative to the defined direction of the third axis Z, each bias component in FIG. 5 is negative.

The processing unit 120 is configured to receive the first set a(t) of acceleration parameters $a_i$, $a_{ii}$, and $a_{iii}$ from the three-dimensional accelerometer 110. Based on the first set a(t), the processing unit 120 is configured to determine behavior-related data D, i.e. descriptions concerning movements and/or positions of the animal A. More precisely, the processing unit 120 is adapted to derive respective estimations of the above-mentioned gravity-related components $g_i$, $g_{ii}$ and $g_{iii}$, i.e. the vector components of the first set $a(t)$ of acceleration parameters $a_i$, $a_{ii}$, and $a_{iii}$, that are parallel to the third axis Z.

The processing unit 120 is further configured to compensate for the respective estimated gravity-related components $g_i$, $g_{ii}$ and $g_{iii}$ in the first set $a(t)$ of acceleration parameters $a_i$, $a_{ii}$ and $a_{iii}$, and as a result, obtain a second set $b(t)$ of acceleration parameters $b_i$, $b_{ii}$ and $b_{iii}$. Consequently, the second set $b(t)$ represents an acceleration of the animal tag 100, where each of the respective accelerations $b_i$, $b_{ii}$ and $b_{iii}$ is balanced around a base level with no influence of the gravitation g.

Figure 6:
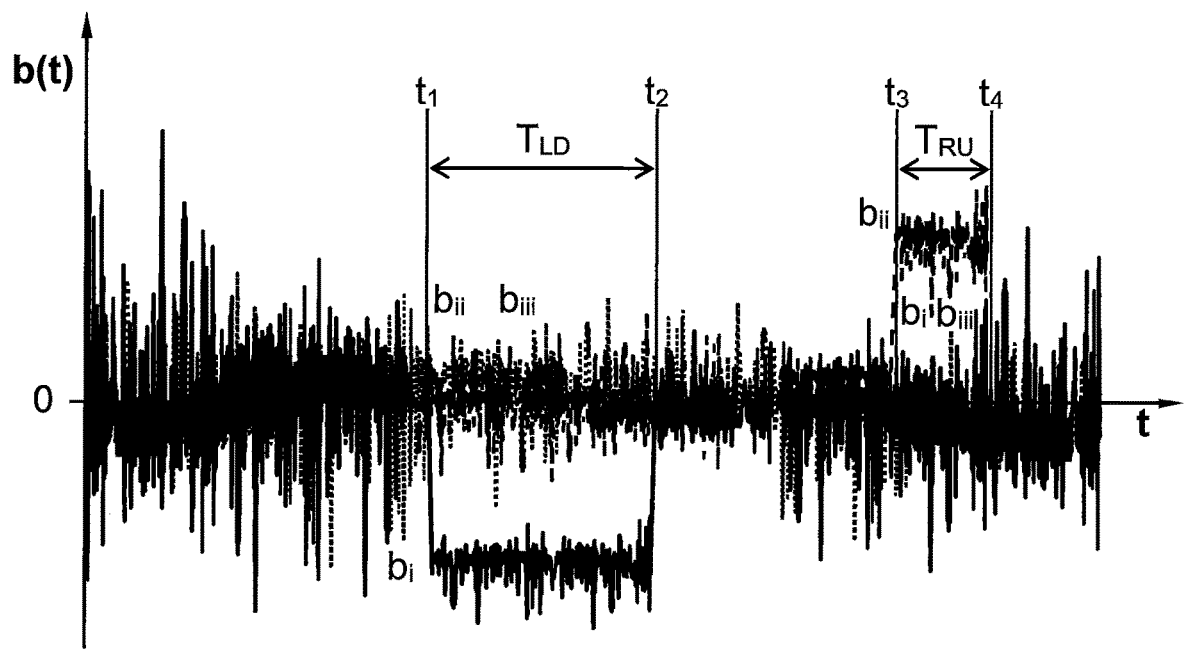
FIG. 6 illustrates an example of how a second set of acceleration parameters may vary over time.

FIG. 6 illustrates an example of such a compensated second set $b(t)$ of acceleration parameters $b_i$, $b_{ii}$ and $b_{iii}$ as functions of time t. Here, the base level is denoted 0.

Based on the second set $b(t)$ of acceleration parameters $b_i$, $b_{ii}$ and $b_{iii}$, the processing unit 120 is configured to determine vertical repositioning of the animal A that carries the animal tag 100. Thus, rise-up and/or lie-down movements can be discriminated based on deviations in a single parameter in the second set $b(t)$ of acceleration parameters relative to the base level 0. Namely, if a non-zero bias level is detected in the second set $b(t)$, this is a strong indicator of vertical movement.

According to one embodiment of the invention, the processing unit 120 is specifically configured to discriminate a positive deviation from the base level 0 in one parameter in the second set $b(t)$ of acceleration parameters to represent behavior-related data D in the form of a rise-up movement of the animal A; and analogously, discriminate a negative deviation from the base level 0 in one parameter in the second set $b(t)$ to represent a lie-down movement.

FIG. 6 exemplifies a negative deviation from the base level 0 in the parameter $b_i$ at a first point in time $t_1$. The negative bias level in the parameter $b_i$ remains until a second point in time $t_2$. The processing unit 120 is configured to interpret this to represent a lie-down movement, which occurs between the first and second points in time $t_1$ and $t_2$ respectively, i.e. for a period $T_{LD}$. In the absence of any other information, the processing unit 120 is configured to conclude that the animal lies down as of the second point in time $t_2$. Then, at a third point in time $t_3$, there is a positive deviation from the base level 0 in the parameter $b_{ii}$. The processing unit 120 is configured to interpret this to represent a rise-up movement of the animal A. Since the positive bias level in the parameter $b_{ii}$ remains until a fourth point in time $t_4$, the processing unit 120 is configured to interpret the rise-up movement to occur until the fourth point in time $t_4$, i.e. for a period $T_{RU}$. In the absence of any other information, the processing unit 120 is configured to conclude that the animal continues to stand up, or walk, from the fourth point in time $t_4$ and onwards.

Preferably, the animal tag 100 contains a signal transmitter 160 that is configured to emit a wireless signal $S_{ID}$, which uniquely identifies the animal tag 100, e.g. via signature data. The wireless signal $S_{ID}$ may be an UWB (Ultra Wideband) signal and is adapted to be received by a number of base stations of a positioning system, typically a so-called RTLS (Real Time Location System). Thereby, the positioning system is enabled to establish a two-dimensional location for the animal tag 100, for example based on triangulation measurements. As a result, the individual lying times and standing times can be correlated with position data, and the exact positions for the animals' respective activities can be registered. Consequently, precise behavior-related information can be derived for each animal. Further, by integrating the rise-up and/or lie-down movements, the positioning system may determine accurate elevation positions for the animal tag 100 and the animal carrying the same.

In order to enable convenient readout of the behavior-related data D derived by the processing unit 120 to one or more remote positions, the animal tag 100 preferably includes a wireless interface 150, which is configured to emit a wireless signal M(D) containing at least one piece of the behavior-related data D.

It is further preferable if the pieces of behavior-related data D can be correlated with specific moments in time also if the data D is readout subsequently. Therefore, according to one embodiment of the invention, the animal tag 100 contains a data storage unit 140. Moreover, the processing unit 120 is configured to assign a respective time stamp to the pieces of the behavior-related data D, and store a set of the pieces of the behavior-related data D together with the respective time stamps assigned thereto in the data storage unit 140. Consequently, the processing unit 120 may retrieve at least one piece of the behavior-related data D and at least one respective time stamp assigned thereto from the data storage unit 140; and cause the wireless interface 150 to emit the wireless signal M(D) containing the at least one piece of the behavior-related data D and the at least one respective time stamp assigned thereto retrieved from the data storage unit 140.

Of course, the wireless signal M(D) should preferably indicate who the sender is. Therefore, according to one embodiment of the invention, the processing unit 120 is configured to cause identification data to be included in the wireless signal M(D). The identification data is adapted to enable a receiver of the wireless signal M(D) to determine an identity of the animal tag 100, for example in the form of a character string.

It is generally advantageous if the processing unit 120 is configured to effect the above-mentioned procedure in an automatic manner by executing a computer program 135. Therefore, the processing unit 120 may include a memory unit, i.e. non-volatile data carrier 130, storing the computer program 135, which, in turn, contains software for making processing circuitry in the form of at least one processor in the processing unit 120 execute the above-described actions when the computer program 135 is run on the at least one processor.

Figure 7:
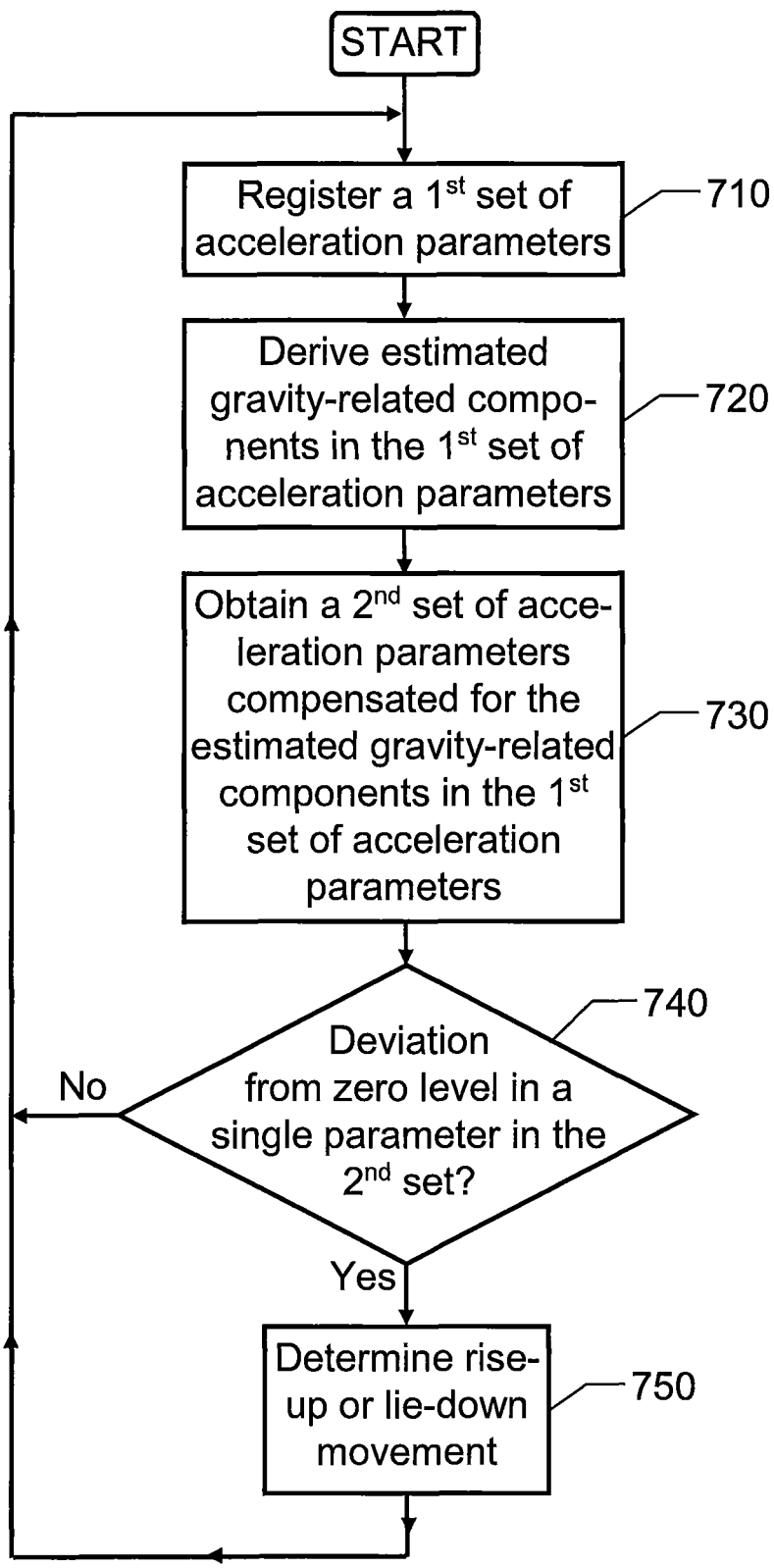
FIG. 7 illustrates, by means of a flow diagram, the general method of determining behavior-related data according to the invention.

In order to sum up, and with reference to the flow diagram in FIG. 7, we will now describe the general method according to the invention for determining behavior-related data concerning an animal to which the tag according to the invention is attached.

In a first step 710, a first set $a(t)$ of acceleration parameters $a_i$, $a_{ii}$, and $a_{iii}$ is received. The acceleration parameters $a_i$, $a_{ii}$ and $a_{iii}$ have been registered by a three-dimensional accelerometer and express a respective acceleration of the tag along each of three independent spatial axes.

Then, in a step 720, a respective estimated gravity-related component $g_i$, $g_{ii}$ and $g_{iii}$ is derived in each parameter in the first set $a(t)$ of acceleration parameters $a_i$, $a_{ii}$ and $a_{iii}$.

Subsequently, in a step 730, a second set $b(t)$ of acceleration parameters $b_i$, $b_{ii}$ and $b_{iii}$ is obtained in which the respective estimated gravity-related components $g_i$, $g_{ii}$, and $g_{iii}$ have been compensated for. The second set $b(t)$ of acceleration parameters $b_i$, $b_{ii}$ and $b_{iii}$ thus represents a respective acceleration of the tag along each of three independent spatial axes each in which said parameter is balanced around a base level with no influence of gravitation.

Then, a step 740 checks if there is a bias-level deviation from the base level in a single parameter $b_i$, $b_{ii}$ and $b_{iii}$ in the second set b(t). If such a deviation is detected, a step 750 follows; and otherwise the procedure loops back to step 710.

In step 750, a rise-up or lie-down movement is discriminated depending on if the deviation detected in step 740 has a positive or a negative sign respectively. Here, any rise-up and/or lie-down movement represents behavior-related data concerning an animal to which the tag is attached. After step 750, the procedure loops back to step 710.

All of the process steps, as well as any sub-sequence of steps, described with reference to FIG. 7 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal, which may be conveyed via electrical or optical cable or by, radio or by other means. When the program is embodied in a signal, which may be conveyed, directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

Although the invention is primarily intended to determining behavior-related data in respect of milk-producing animals, e.g. cows, the solution described herein is equally well applicable for any other kind of livestock or wild animals.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. An animal tag comprising:
a three-dimensional accelerometer configured to register a first set of acceleration parameters expressing a respective acceleration of the animal tag along each of three independent spatial axes; and
a processor configured to receive the first set of acceleration parameters and, based on the first set of acceleration parameters, determine behavior-related data, the processor being configured to:
derive a respective estimated gravity-related component in each parameter in the first set of acceleration parameters,
compensate for the respective estimated gravity-related components in the first set of acceleration parameters to obtain a second set of acceleration parameters representing a respective acceleration of the animal tag along each of the three independent spatial axes each in which said parameter is balanced around a base level with no influence of gravitation, and
discriminate one or more of a rise-up movement and a lie-down movement of an animal carrying the animal tag based on deviations in a single parameter in the second set of acceleration parameters relative to the base level.

2. The animal tag according to claim 1, wherein the processor is configured to:
discriminate a positive deviation from the base level in one parameter in the second set of acceleration parameters to represent the behavior-related data of the rise-up movement of the animal carrying the animal tag, and
discriminate a negative deviation from the base level in another parameter in the second set of acceleration parameters to represent the behavior-related data of the lie-down movement of the animal carrying the animal tag.

3. The animal tag according to claim 1, further comprising a signal transmitter configured to emit a wireless signal uniquely identifying the animal tag, the wireless signal able be received by a plurality of base stations of a positioning system to enable establishing a two-dimensional location for the animal tag.

4. The animal tag according to claim 1, further comprising a wireless interface configured to emit a wireless signal containing at least one piece of the behavior-related data.

5. The animal tag according to claim 1, further comprising a data storage,
the processor being configured to:
assign a respective time stamp to pieces of the behavior-related data, and
store a set of the pieces of the behavior-related data together with said respective time stamps assigned thereto in the data storage.

6. The animal tag according to claim 4,
wherein the processor is configured to:
assign a respective time stamp to pieces of the behavior-related data,
store a set of the pieces of the behavior-related data together with said respective time stamps assigned thereto in the data storage,
retrieve at least one piece of the pieces of behavior-related data and at least one of the respective time stamps assigned thereto from the data storage, and
cause the wireless interface to emit the wireless signal containing the at least one piece of the behavior-related data and the at least one respective time stamp assigned thereto retrieved from the data storage.

7. The animal tag according to claim 4, wherein the processor is configured to cause identification data to be included in the wireless signal, the identification data enabling receivers of the wireless signal to determine an identity of the animal tag.

8. The animal tag according to claim 1, wherein the animal tag is configured to be attached to at least one of a neckband and an ear on the animal.

9. A method to be implemented in an animal tag to determine behavior-related data concerning an animal to which the animal tag is attached, the method comprising:

registering, via a three-dimensional accelerometer, a first set of acceleration parameters expressing a respective acceleration of the animal tag along each of three independent spatial axes;

determining, in at least one processor, the behavior-related data, based on the first set of acceleration parameters;

deriving, by the at least one processor, a respective estimated gravity-related component in each parameter in the first set of acceleration parameters;

compensating for the respective estimated gravity-related components in the first set of acceleration parameters to obtain a second set of acceleration parameters representing a respective acceleration of the animal tag along each of the three independent spatial axes each in which said parameter is balanced around a base level with no influence of gravitation; and discriminating one or more of a rise-up movement and a lie-down movement of the animal based on deviations in a single parameter in the second set of acceleration parameters relative to the base level.

10. The method according to claim 9, further comprising:

discriminating a positive deviation from the base level in one parameter in the second set of acceleration parameters to represent the behavior-related data of the rise-up movement of the animal carrying the animal tag; and discriminating a negative deviation from the base level in one parameter in the second set of acceleration parameters to represent the behavior-related data of the lie-down movement of the animal carrying the animal tag.

11. The method according to claim 9, further comprising:

emitting, via a signal transmitter, a wireless signal uniquely identifying the animal tag, the wireless signal able to be received by a plurality of base stations of a positioning system to enable establishing a two-dimensional location for the animal tag.

12. The method according to claim 9, further comprising:

emitting, via a wireless interface, a wireless signal containing at least one piece of the behavior-related data.

13. The method according to claim 9, further comprising:

assigning a respective time stamp to pieces of the behavior-related data; and storing a set of the pieces of the behavior-related data together with said respective time stamps assigned thereto in a data storage.

14. The method according to claim 12, further comprising:

assign a respective time stamp to pieces of the behavior-related data;

store a set of the pieces of the behavior-related data together with said respective time stamps assigned thereto in the data storage;

retrieving at least one piece of the pieces of behavior-related data and at least one of the respective time stamps assigned thereto from the data storage; and emitting, via the wireless interface, the wireless signal containing the at least one piece of the behavior-related data and the at least one respective time stamp assigned thereto retrieved from the data storage.

15. The method according to claim 12, further comprising:

including identification data in the wireless signal, the identification data enabling receivers of the wireless signal to determine an identity of the animal tag.

16. A non-transitory computer-readable medium storing a computer program loadable into a non-volatile data carrier communicatively connected to a processor, the computer program comprising software for executing the method according to claim 9 when the computer program is run on the processor.

17. A non-volatile data carrier containing a computer program comprising software for executing the method according to claim 9 when the computer program is run on a processor.

18. The animal tag according to claim 1, wherein the rise-up movement or the lie-down movement are discriminated based on the deviations in the single parameter occurring within a time period between a first point in time and a second point in time.

19. The method according to claim 9, wherein the rise-up movement or the lie-down movement are discriminated based on the deviations in the single parameter occurring within a time period between a first point in time and a second point in time.

* * * * *